United States Patent
Graman

(10) Patent No.: US 9,013,075 B2
(45) Date of Patent: Apr. 21, 2015

(54) INDUCTION MOTORS INCLUDING VENT SPACERS, ROTOR CORE ASSEMBLIES INCLUDING VENT SPACERS, AND METHODS OF OPERATING SAME

(75) Inventor: Michael A. Graman, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 138 days.

(21) Appl. No.: 13/613,507

(22) Filed: Sep. 13, 2012

(65) Prior Publication Data

US 2014/0070641 A1     Mar. 13, 2014

(51) Int. Cl.
*H02K 1/20*     (2006.01)
*H02K 1/32*     (2006.01)

(52) U.S. Cl.
CPC ........................................ *H02K 1/32* (2013.01)

(58) Field of Classification Search
None
See application file for complete search history.

(56) References Cited

U.S. PATENT DOCUMENTS

| | | | |
|---|---|---|---|
| 890,577 A * | 6/1908 | Richards | 310/65 |
| 3,809,935 A | 5/1974 | Kristen | |
| 4,341,966 A * | 7/1982 | Pangburn | 310/61 |
| 4,352,034 A * | 9/1982 | Karhan et al. | 310/59 |
| 4,499,660 A * | 2/1985 | Lenz | 29/598 |
| 4,745,314 A * | 5/1988 | Nakano | 310/57 |
| 5,189,325 A * | 2/1993 | Jarczynski | 310/54 |
| 5,818,133 A | 10/1998 | Horski | |
| 5,844,338 A | 12/1998 | Horski | |
| 7,459,817 B2 * | 12/2008 | VanLuik et al. | 310/89 |
| 7,646,119 B2 * | 1/2010 | Schmidt | 310/61 |
| 2008/0030086 A1* | 2/2008 | Noda et al. | 310/57 |
| 2009/0261669 A1* | 10/2009 | Sirois | 310/59 |
| 2010/0176670 A1 | 7/2010 | Gottfried | |
| 2011/0254391 A1* | 10/2011 | Elender et al. | 310/52 |

FOREIGN PATENT DOCUMENTS

| | | |
|---|---|---|
| DE | 202011107009 U1 | 11/2011 |
| EP | 2110927 A2 | 10/2009 |
| SU | 1159113 A1 | 5/1985 |
| WO | 2004/093292 A2 | 10/2004 |

OTHER PUBLICATIONS

PCT International Search Report mailed Jan. 27, 2015 corresponding to PCT International Application No. PCT/US2013/058196 filed Sep. 5, 2013 (11 pages).

* cited by examiner

*Primary Examiner* — Tran Nguyen

(57) ABSTRACT

Vent spacers and induction motor rotor core assemblies for induction motors are disclosed. The induction motor rotor assembly includes at least two rotor packages, each having axial sidewalls, a radial periphery, and axial vents, and a vent spacer positioned between opposing axial sidewalls of the at least two rotor packages. The vent spacer has a hub and a plurality of radially-extending fins coupled to the hub, the fins extending approximately to a radial periphery and extending axially between the opposed axial sidewalls to form a plurality of radial cooling channels extending between the sidewalls. Induction motors and methods of operating the induction motors are disclosed, as are other aspects.

20 Claims, 6 Drawing Sheets

US 9,013,075 B2

INDUCTION MOTORS INCLUDING VENT SPACERS, ROTOR CORE ASSEMBLIES INCLUDING VENT SPACERS, AND METHODS OF OPERATING SAME

FIELD

The present invention relates generally to induction motors, rotor core assemblies, and more particularly to vent spacers of rotor core assemblies.

BACKGROUND

Within induction motors, a large amount of heat may be generated during operation. Accordingly, to prevent damage to the internal components and extend longevity, cooling of the rotor core is generally desired. Typically, such an induction motor includes a rotor core assembly that has packets of laminated steel discs mounted to a shaft. Each of the adjacent packets is interspersed with a vent spacer. The vent spacers cooperate with axial vents formed through the packages to provide a system of axial and radial rotor core ventilation. One or more fans of the induction motor may aerodynamically couple with and supply a cooling air flow through the axial vents and out through radial flow passages. To form the radial flow passages, conventional vent spacers have a multi-piece construction with a central disc and with a number of bar elements welded to the side faces thereof. The bar elements contact the sides of the packages, spacing them apart, and forming multiple radial flow passages up each side of the central disc between respective adjacent packages.

However, such existing rotor core assemblies tend to be complicated, and, therefore, expensive. Moreover, improved cooling efficiency is sought. Thus, improved construction of rotor core assemblies is sought.

SUMMARY

In one embodiment, an induction motor rotor core assembly is provided. The induction motor rotor core assembly includes a plurality of rotor packages, each rotor package having axial sidewalls, a radial periphery, and axial vents passing axially through the rotor packages, and at least one vent spacer positioned between opposing axial sidewalls of the plurality of rotor packages, the at least one vent spacer having a hub and a plurality of fins coupled to the hub, the fins extending radially to a location proximate to the radial periphery and extending axially to span between the axial sidewalls and form a plurality of radial cooling channels defined by the plurality of fins and the axial sidewalls wherein the plurality of radial cooling channels extend between the axial vents and the radial periphery.

In another embodiment, an induction motor rotor core assembly is provided. The induction motor rotor core assembly includes a shaft, a plurality of rotor packages mounted on the shaft, each rotor package having axial sidewalls, a radial periphery, and axial vents passing axially through the rotor packages, and a plurality of vent spacers mounted on the shaft and positioned between opposing axial sidewalls of each of the plurality of rotor packages, each vent spacer having a hub and a plurality of fins coupled to the hub, the fins extending radially to a location proximate to the radial periphery and extending axially to span between the axial sidewalls and form a plurality of radial cooling channels between adjacent rotor packages, the radial cooling channels defined by the plurality of fins and the axial sidewalls wherein the plurality of radial cooling channels extend between the axial vents and the radial periphery wherein more than one axial vent intersects with at least some of the radial cooling channels.

In another embodiment, a vent spacer of an induction motor rotor core assembly is provided. The vent spacer includes a hub having a cylindrical bore adapted to receive a shaft, and a plurality of fins coupled to the hub, the fins extending radially outward from the hub.

In a method aspect, a method of operating an induction motor is provided. The method includes providing a plurality of rotor packages, each rotor package having axial sidewalls, a radial periphery, and axial vents passing through the rotor packages, providing a vent spacer between the axial sidewalls of adjacent rotor packages, each vent spacer having a hub and a plurality of fins coupled to the hub, the fins extending radially to a location proximate to the radial periphery and extending axially between the axial sidewalls to form a plurality of radial cooling channels, and flowing gas through the plurality of radial cooling channels.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

DESCRIPTION

In view of the foregoing difficulties, an improved induction motor rotor core assembly and induction motor is provided. In one aspect, the induction motor rotor core assembly includes a plurality of rotor packages, each of which may be an assembly of laminated plates, and a vent spacer positioned (sandwiched) between axial sidewalls of the adjacent rotor packages. The rotor packages are adapted to be received over a shaft of the rotor core assembly, and each of the packages includes axial vents for providing ventilation to the rotor core. The vent spacer includes a hub adapted to be received over the shaft of the rotor core assembly, and a plurality of fins that extend radially outward therefrom. The rotor packages and vent spacers cooperate, and are in contact with each other, to form a plurality of radial flow channels that are defined by the sidewalls of the adjacent rotor packages and the plurality of fins. The radial flow channels interconnect with, and fluidly couple to, the axial vents to provide a system of ventilation for the rotor core assembly. Methods of operating an induction motor including the improved rotor core assembly and vent spacer are provided, as are other aspects.

As will become apparent from the various embodiments, the improved induction rotor core assembly advantageously may exhibit improved rotor core cooling, but also may provide a simpler and more cost effective ventilation system for the induction rotor core.

These and other embodiments of induction motors, induction motor rotor core assemblies, rotor packages, vent spacers, and methods of operating induction motor rotor core assemblies and induction motors are described below with reference to FIGS. 1-6 herein. The drawings are not necessarily drawn to scale. Like numerals are used throughout to denote like elements.

Figure 1:
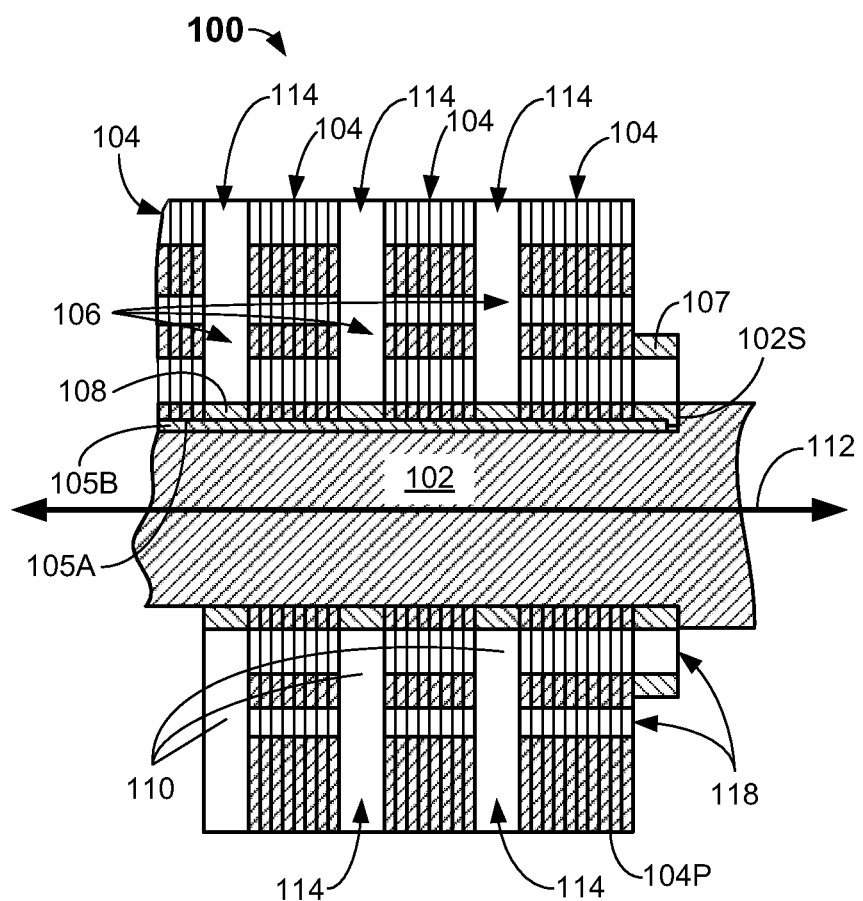
FIG. 1 illustrates a cross-sectioned partial side view of an induction motor rotor core assembly according to embodiments.

Referring now in specific detail to FIG. 1, an induction motor rotor core assembly 100 adapted for use in an induction motor is shown. The induction motor rotor core assembly 100 has a shaft 102 that is installed in a housing of an induction motor and supported by suitable bearings (See FIG. 5). The induction motor rotor core assembly 100 comprises a plurality of rotor packages 104, and at least one vent spacer 106 that is positioned between opposing sidewalls 104A, 104B (FIG. 2B) of the plurality of rotor packages 104. As shown, a plurality of vent spacers 106 provided, with a vent spacer 106 provided in contact with, and sandwiched between, each of the rotor packages 104. Thus, the depicted embodiment has a plurality of rotor packages 104 and a plurality of vent spacers 106.

The rotor packages 104 and vent spacers 106 are received on the shaft 102, such as the step shaft shown. Each of the rotor packages 104 may include a central bore 104H adapted to be received over the shaft 102, and may include one or more rotational aligning members 105A (FIGS. 2A-2B), such as one or more keyways. The rotational aligning members 105A may interface with one or more mating aligning members 105B on the shaft 102, such as one or more keys. Any number of rotational aligning members 105A may be provided, such as 1, 2, 3 or more. Optionally, one or more tabs on the rotor packages 104 may be received in the one or more corresponding axial grooves formed in the shaft 102, for example. Other aligning means may be provided.

Each end of the induction motor rotor core assembly 100 may include a pressure ring 107 (only one end is shown). On the right end, the pressure ring 107 is sandwiched between the step 102S on the shaft 102 and the end-most rotor package 104, which may have a slightly thicker dimension than the center rotor packages 104. A like pressure ring (the same as pressure ring 107) may be provided on the other end of the induction motor rotor core assembly 100 (not shown). One or more tangential keys may be used to hold the assembly together, for example. However, any suitable fastening means may be used for fastening the rotor packages 104 and vent spacers 106 on the shaft 102.

Figures 2A, 2B:
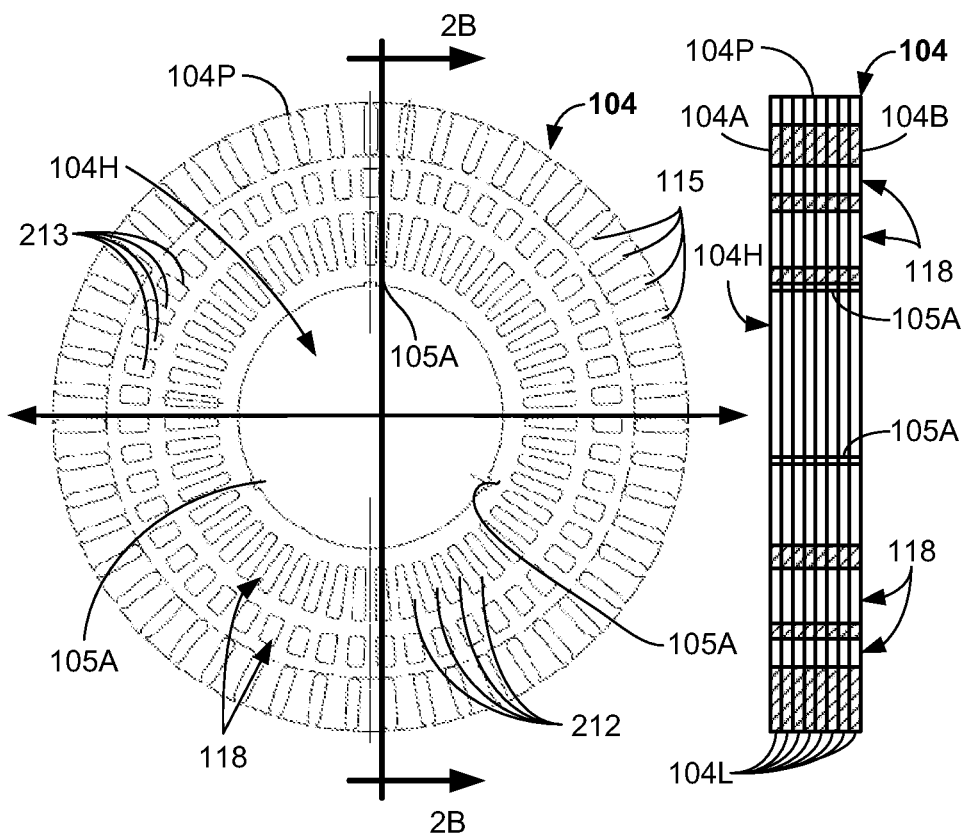
FIG. 2A illustrates a front plan view of a rotor package according to embodiments.
FIG. 2B illustrates a cross-sectioned side view of a rotor package taken along section line 2B-2B of FIG. 2A.

As shown in FIGS. 2A-2B, each of the plurality of rotor packages 104 has axial sidewalls 104A, 104B, a radial periphery 104P, and a plurality of axial vents 118 passing axially through at least some of the rotor packages 104. In the depicted embodiment, the axial vents 118 pass axially through each of the rotor packages 104. The axial vents 118 may include a first set of axial vents 212 (a few labeled) that may be arranged in a first ring and a second set of axial vents 213 (a few labeled) that may be arranged in a second ring. The first set 212 may be smaller in diameter than the second ring 213. The second set 213 may be positioned radially outward from the first set 212. Other patterns of vents 118 may be provided. As depicted, for at least some of the vents 118, an inner vent and an outer vent may be aligned along a radial vector extending from the central bore 104H to the outer periphery 104P. As will be apparent from the assembly view of FIG. 4, this construction of the rotor package 104 provides the ability to provide two axial vents 212, 213 intersecting with, and feeding cooling air into, each radial cooling channel 114. Accordingly improved cooling may be provided. The rotor package 104 may include a plurality of periphery cutouts 115 arranged about the radial periphery 104P. Each of the periphery cutouts 115 is adapted to receive a rotor bar 532 (FIG. 5).

Each of the rotor packages 104 may be manufactured from a laminated disc-shaped plates 104L, which may be a ferrous material such as steel (e.g., C5 core plate material, or the like), for example. Other suitable ferrous materials may be used. The individual laminated disc-shaped plates 104L of each rotor package 104 may be stamped, laser cut, water jet cut, or the like.

Figure 3A:
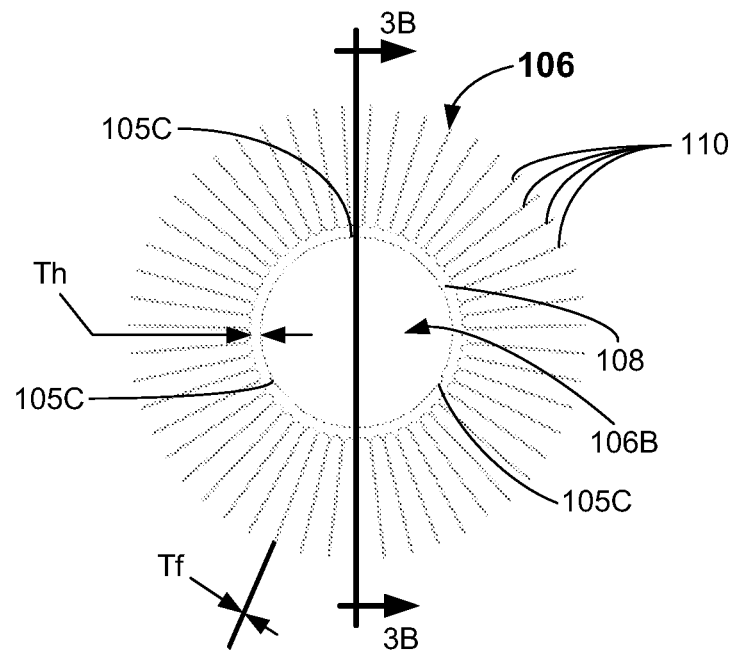
FIG. 3A illustrates a front plan view of a vent spacer according to embodiments.
Figure 3B:
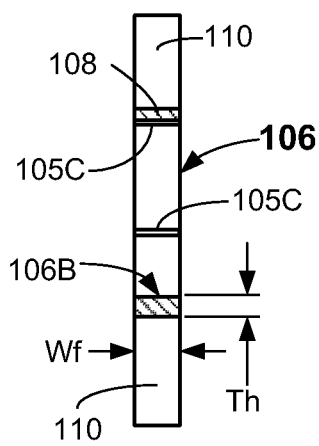
FIG. 3B illustrates a cross-sectioned side view of a vent spacer taken along section line 3B-3B of FIG. 3A.

As Shown in FIGS. 3A-3B, the vent spacer 106 includes a hub 108 having a central bore 106B that is adapted to be received over the shaft 102, and a plurality of fins 110 coupled directly to the hub 108. The hub 108 may be generally cylindrical in shape. The fins 110 may extend in a generally radial direction (i.e., extend radially) from the hub 108. The fins 110 may extend to a location that is proximate to the radial periphery 104P of the rotor packages 104 (See FIG. 4B). Generally, the fins 110 will extend radially to within about 2 mm to about 10 mm from the radial periphery 104P. The fins 110 may be straight and have a constant thickness of Tf along their length. As shown, the vent spacer 106 may consist of a single-piece construction of the hub 108 and plurality of fins 110. For example, the vent spacer 106 may be laser cut from a single piece of steel, such as carbon steel (e.g., ANSI 1045 steel or A36 steel). Other suitable thermally-conductive materials may be used for the vent spacer 106. Each of the vent spacers 106 may also include one or more rotation restraining members 105C.

Again referring to FIG. 1, the fins 110 also extend axially along the direction of an axial axis 112 of the shaft 102 between the axial sidewalls 104A, 104B and in cooperation with the sidewalls 104A, 104B form a plurality of radial cooling channels 114. The radial cooling channels 114 are arranged about the axial axis 112 and extend between the between opposing axial sidewalls 104A, 104B as well as from the axial vents 118 to the radial periphery 104P. Each of the radial cooling channels 114 has a width that is approximately the same as the width of the vent spacer 106 (FIG. 3B). For example, the radial cooling channels 114 may have a width that is the same as the width Wf of the fins 110 of the vent spacer 106. The radial cooling channels 114 formed by the fins 110 and the sidewalls 104A, 104B allow a flow of cooling air to be provided from the axial vents 118 and flow radially outward along the fins 110 and exit adjacent to the radial periphery 104P. The air flow through the axial vents 118 and the radial cooling channels 114 may be provided by one or more suitable fans 526E, 526B (FIG. 5). For example, in some embodiments, a fan at one end provides the moving air flowing only in one direction through the axial vents 118. In another embodiment, multiple fans may force cooling air in from both ends of the rotor core assembly 100.

Referring again to FIGS. 3A-3B, the hub 108 may have a radial thickness Th of between about 20 mm to about 40 mm.

Other thicknesses may be used. As depicted, the hub 108 is a cylinder. However, other configurations are possible. The fins 110 may each have a thickness Tf of between about 3 mm and about 10 mm, or about 5 mm in some embodiments. Furthermore, the fins 110 may have an axial width Wf of between about 5 mm and about 16 mm. Other fin thicknesses Tf and fin widths Wf may be used. The fins 110 may be straight along their length from their root where the fins 110 connect to the hub 108 to their terminal ends adjacent to the radial periphery 104P. A full radius may be provided between each fin 110 at the root thereof. The hub 108 may have a width that is the same as the width Wf of the fins 110. The vent spacer 106 may have between about 30 fins and about 100 fins, between about 40 and 70 fins in some embodiments, and about 50 fins in some embodiments. The large number of fins 110 may form between about 30 and about 100 radial cooling channels 114 between the adjacent rotor packages 104. The vent, spacers 106 may include one or more rotational aligning members 105C (FIGS. 3A-3B), such as one or more keyways. The rotational aligning members 105C may interface with one or more mating aligning members 105B on the shaft 102, such as one or more keys. Any number of rotational aligning members 105C may be provided, such as 1, 2, 3 or more. Optionally, one or more tabs on the vent spacer 106 may be received in the one or more corresponding axial grooves formed in the shaft 102, for example. Other aligning means may be provided. The aligning member 105C function to align the fins in between the axial vents 118.

Figure 4:
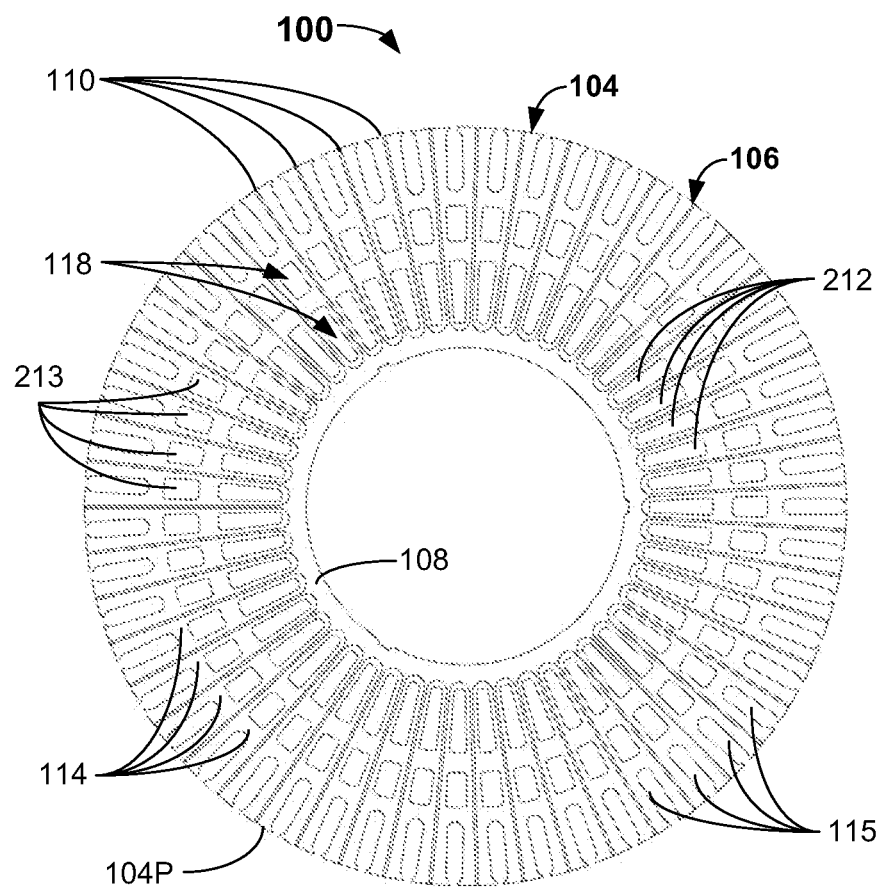
FIG. 4 illustrates a front plan view of a vent spacer with package behind showing the orientation of the fins relative to the axial vents of the package according to embodiments.
Figure 5:
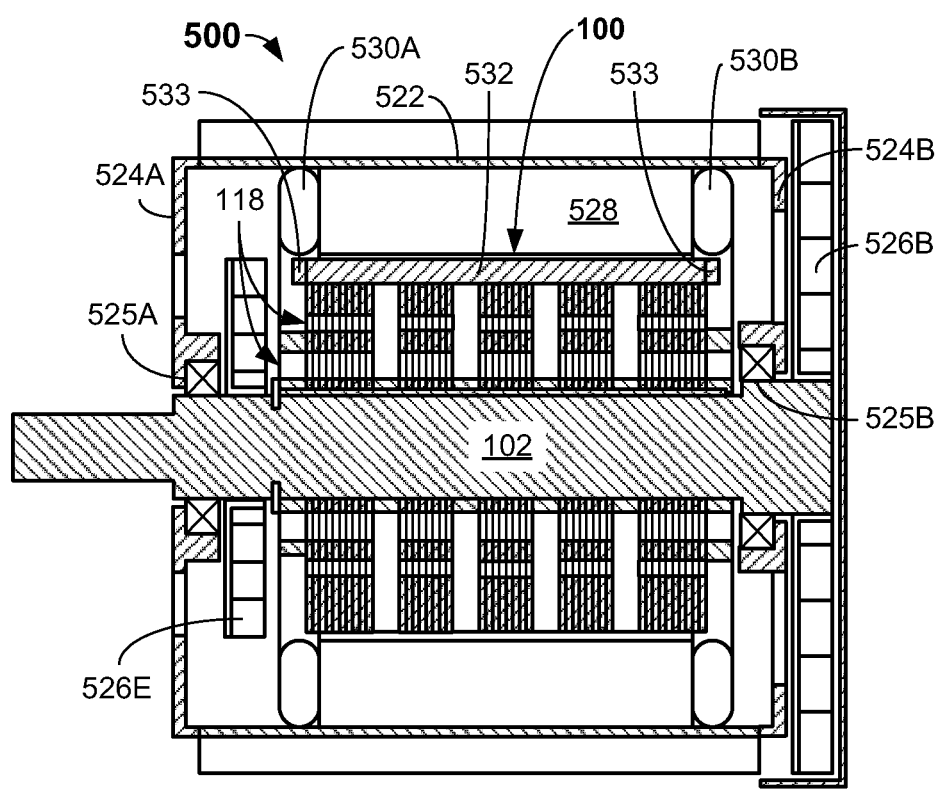
FIG. 5 illustrates a cross-sectioned side view of an induction motor including the induction motor rotor core assembly according to embodiments.

As shown in FIG. 4, the induction motor rotor core assembly 100 may have a fin 110 (only a few labeled) positioned to be aligned between each adjacent axial vent 118. For example, as shown in FIG. 4, the fins 110 of the vent spacer 106 are positioned to receive cooling air flow from each of the sets of the axial vents 212, 213 in the rotor package 104 into the radial cooling channels 114. The gas (e.g., air) is adapted to pass through the plurality of radial cooling channels 114 by first flowing the gas (e.g., air) through the axial vents 118 and then out through the plurality of radial cooling channels 114 to the radial periphery 104P. As shown and oriented, the fins 110 are in contact with and supported along their entire length from their root adjacent to the hub 108 to the radial periphery 104P by the sidewalls 104A, 104B. Also, more than one axial vent 212, 213 may intersect with at least some of the radial cooling channels 114. As shown, two axial vents 212, 213 intersect with each radial cooling channel 114. Accordingly, one or more, and in some embodiments, all of the rotor packages 104 comprise at least two radial aligned axial vents (e.g., 212, 213). Even more than two aligned axial vents may be provided that intersect at least some of the radial cooling channels. This provides improved rotor cooling.

FIG. 5 illustrates an induction motor 500 including the inventive rotor core assembly 100. The induction motor 500 may include a housing 520 having a center portion 522 and connected ends 524A, 524B. The ends 524A, 524B may include bearings 525A, 525B that support the rotor core assembly 100 by the shaft 102. The rotor core assembly 100 may include a plurality of rotor bars 532 received in each of the periphery cutouts 115 (FIG. 2A). The bars 532 may be copper and may be tied together with end discs 533 braised to the bars 532. Fans 526E, 526B may be provided on one or both ends of the induction motor 500 to provide air flow to the axial vents 118 and aid in cooling of the rotor core assembly 100. The rotor core assembly 100 resides adjacent to the stator 528 and the coils 530A, 530B, which are of conventional construction.

Figure 6:
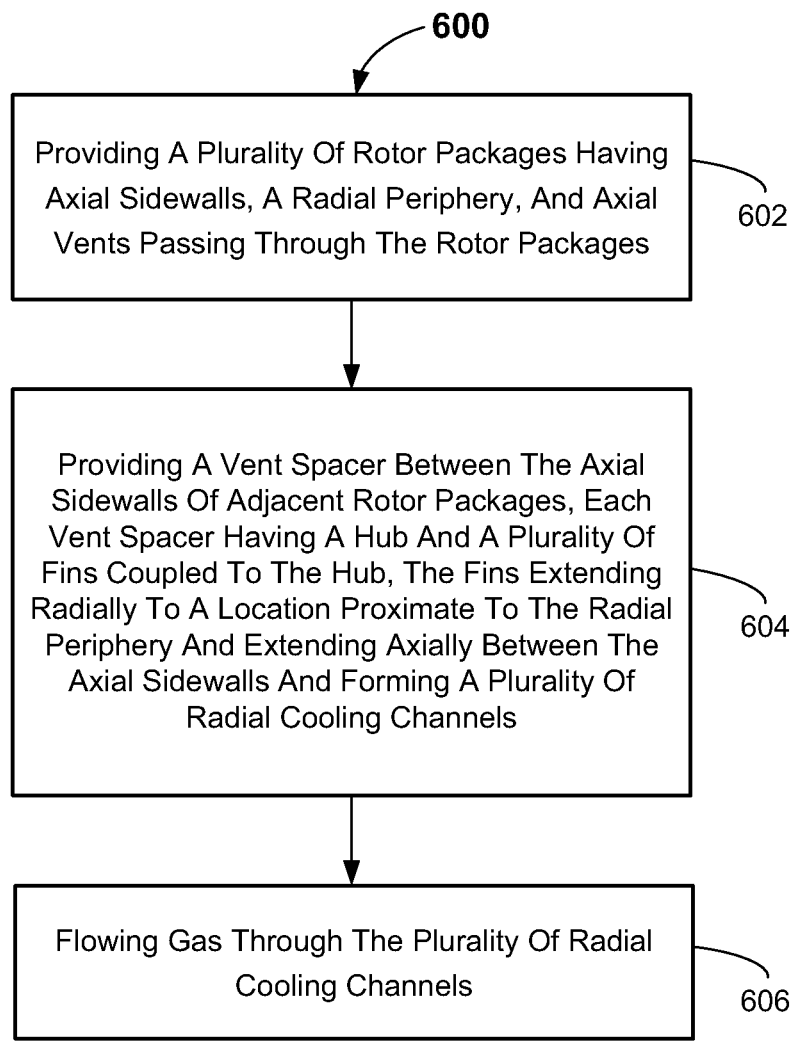
FIG. 6 is a flowchart illustrating a method of operating an induction motor according to embodiments.

FIG. 6 illustrates a flowchart of a method of operating the induction motor having the rotor core assembly (e.g., 100) according to embodiments. The method 600 includes, in 602, providing a plurality of rotor packages (e.g., rotor packages 104), each rotor package having axial sidewalls (e.g., axial sidewalls 104A, 104B) and a radial periphery (e.g., radial periphery 104P), and at least some of the rotor packages having axial vents (e.g., axial vents 118) passing through the rotor packages, and, in 604, providing a vent spacer (e.g., vent spacer 106) between the axial sidewalls of adjacent rotor packages, each vent spacer having a hub (e.g., hub 108), and a plurality of fins (e.g., fins 110) coupled to the hub, the fins extending radially to a location proximate to the radial periphery and extending axially between the axial sidewalls and forming a plurality of radial cooling channels (e.g., radial cooling channels 114), and, in 606, flowing gas (e.g., air) through the plurality of radial cooling channels.

While the invention is susceptible to various modifications and alternative forms, specific embodiments and methods thereof have been shown by way of example in the drawings and are described in detail herein, it should be understood, however, that it is not intended to limit the invention to the particular apparatus, systems, or methods disclosed, but, to the contrary, the intention is to cover all modifications, equivalents and alternatives failing within the scope of the invention.

What is claimed is:

1. An induction motor rotor core assembly, comprising:
a plurality of rotor packages, each rotor package having axial sidewalls, a radial periphery, axial vents passing axially through the rotor packages, and cutouts arranged about the radial periphery adapted to receive rotor bars; and
at least one vent spacer positioned between opposing axial sidewalls of the plurality of rotor packages, the at least one vent spacer having a hub and a plurality of individual fins, each individual fin of the plurality of fins coupled directly to the hub, the hub and the plurality of individual fins having a same axial width, and each individual fin of the plurality of fins extending radially from the hub to a location proximate to the radial periphery of the plurality of rotor packages and extending axially to span between the axial sidewalls and form a plurality of radial cooling channels defined by the plurality of fins and the axial sidewalls, wherein the plurality of radial cooling channels extend between the axial vents and the radial periphery, and wherein each individual fin of the plurality of individual fins is positioned between at least two adjacent cutouts of the plurality of rotor packages.

2. The induction motor rotor core assembly of claim 1, wherein the hub comprises a radial hub thickness Th of between about 20 mm to about 40 mm.

3. The induction motor rotor core assembly of claim 1, wherein the at least one vent spacer consists of a single piece construction of the hub and plurality of fins.

4. The induction motor rotor core assembly of claim 1, wherein the fins comprise a thickness Tf of between about 3 mm and about 10 mm.

5. The induction motor rotor core assembly of claim 4, wherein the fins comprise an axial width Wf of between about 5 mm and about 16 mm.

6. The induction motor rotor core assembly of claim 1, wherein each vent spacer comprises between about 30 fins and about 100 fins.

7. The induction motor rotor core assembly of claim 1, wherein each vent spacer comprises between about 40 fins and about 70 fins.

8. The induction motor rotor core assembly of claim 1, comprising at least two radial aligned axial vents in each rotor package.

9. The induction motor rotor core assembly of claim 1, comprising at least two radial aligned axial vents intersecting with each of the plurality of radial cooling channels.

10. The induction motor rotor core assembly of claim 1, comprising a first set of axial vents arranged in a ring, and a second set of axial vents arranged in a ring.

11. The induction motor rotor core assembly of claim 1, comprising a first set of axial vents and a second set of axial vents, the second set of axial vents positioned radially outward from the first set of axial vents.

12. The induction motor rotor core assembly of claim 1, wherein each vent spacer comprises between about 30 fins and about 100 fins, and each fin has a thickness Tf of between about 3 mm and about 10 mm, and an axial width Wf of between about 5 mm and about 16 mm.

13. The induction motor rotor core assembly of claim 1, wherein the at least one vent spacer consists of a single-piece construction of the hub and fins and has between about 30 fins and about 100 fins, the hub has a radial hub thickness Th of between about 20 mm to about 40 mm, and each fin has a thickness Tf of between about 3 mm and about 10 mm, and an axial width Wf of between about 5 mm and about 16 mm.

14. An induction motor rotor core assembly, comprising:
a shaft;
a plurality of rotor packages mounted on the shaft, each rotor package having axial sidewalls, a radial periphery, axial vents passing axially through the rotor packages, and cutouts arranged about the radial periphery adapted to receive rotor bars; and
a plurality of vent spacers mounted on the shaft and positioned between opposing axial sidewalls of each of the plurality of rotor packages, each vent spacer having a hub and a plurality of individual fins, each individual fin of the plurality of fins coupled directly to the hub, the hub and the plurality of individual fins having a same axial width, and each individual fin of the plurality of fins extending radially from the hub to a location proximate to the radial periphery of the plurality of rotor packages and extending axially to span between the axial sidewalls and form a plurality of radial cooling channels between adjacent rotor packages, the radial cooling channels defined by the plurality of individual fins and the axial sidewalls, wherein the plurality of radial cooling channels extend between the axial vents and the radial periphery, wherein more than one axial vent intersects with at least some of the radial cooling channels, and wherein each individual fin of the plurality of individual fins is positioned between at least two adjacent cutouts of the plurality of rotor packages.

15. A vent spacer of an induction motor rotor core assembly, comprising:
a hub having a cylindrical bore for receiving a shaft;
a plurality of individual fins, each individual fin of the plurality of fins coupled directly to the hub, each fin of the plurality of individual fins extending radially outward from the hub, the hub and the plurality of fins having a same axial width; and
one or more rotation restraining members,
wherein the vent spacer is positioned between opposing axial sidewalls of rotor packages of an induction motor rotor core assembly, the rotor packages comprising cutouts arranged at a radial periphery adapted to receive rotor bars, and
wherein each individual fin of the plurality of individual fins is positioned between at least two adjacent cutouts of the rotor packages.

16. A method of operating an induction motor, comprising:
providing a plurality of rotor packages, each rotor package having axial sidewalls, a radial periphery, axial vents passing through the rotor packages, and cutouts arranged about the radial periphery adapted to receive rotor bars;
providing a vent spacer between the axial sidewalls of adjacent rotor packages, the vent spacer having a hub and a plurality of individual fins, each individual fin of the plurality of fins coupled directly to the hub, the hub and the plurality of individual fins having a same axial width, and each individual fin of the plurality of individual fins extending radially from the hub to a location proximate to the radial periphery of the plurality of rotor packages and extending axially between the axial sidewalls to form a plurality of radial cooling channels, wherein each individual fin of the plurality of individual fins is positioned between at least two adjacent cutouts of the plurality of rotor packages; and
flowing gas through the plurality of radial cooling channels.

17. The method of claim 16, wherein the flowing gas through the plurality of radial cooling channels comprises flowing gas through the axial vents and out through the plurality of radial cooling channels to the radial periphery.

18. The method of claim 16, comprising forming between about 30 and about 100 radial cooling channels between the adjacent rotor packages.

19. The method of claim 16, comprising aligning the vent spacer relative to two adjacent rotor packages so that two adjacent fins are aligned between axial vents.

20. The method of claim 16, comprising forming the vent spacer to consist of a single-piece construction of the hub and fins and to have between about 30 fins and about 100 fins, a radial hub thickness Th of between about 20 mm to about 40 mm, and each fin having a thickness Tf of between about 3 mm and about 10 mm, and an axial width Wf of between about 5 mm and about 16 mm.

* * * * *